US011875188B2

(12) United States Patent
Simpson et al.

(10) Patent No.: US 11,875,188 B2
(45) Date of Patent: Jan. 16, 2024

(54) DATA PROCESSING SYSTEM USING DIRECTED ACYCLIC GRAPH AND METHOD OF USE THEREOF

(71) Applicant: UVUE LTD, Cambridge (GB)

(72) Inventors: Toby William Simpson, Cambridge (GB); Troels Rønnow, Cambridge (GB); Jonathan Ward, Cambridge (GB); Thomas Hain, Cambridge (GB)

(73) Assignee: Uvue Ltd, Cambridge (GB)

( * ) Notice: Subject to any disclaimer, the term of this patent is extended or adjusted under 35 U.S.C. 154(b) by 752 days.

(21) Appl. No.: 17/041,983

(22) PCT Filed: Mar. 25, 2019

(86) PCT No.: PCT/EP2019/057471
§ 371 (c)(1),
(2) Date: Sep. 25, 2020

(87) PCT Pub. No.: WO2019/185558
PCT Pub. Date: Oct. 3, 2019

(65) Prior Publication Data
US 2021/0089356 A1 Mar. 25, 2021

(30) Foreign Application Priority Data

Mar. 26, 2018 (GB) ..................................... 1804836

(51) Int. Cl.
*G06F 9/46* (2006.01)
*G06F 9/50* (2006.01)
(Continued)

(52) U.S. Cl.
CPC .......... *G06F 9/5027* (2013.01); *H04L 9/0643* (2013.01); *H04L 9/12* (2013.01);
(Continued)

(58) Field of Classification Search
CPC ..................................................... G06F 9/5027
(Continued)

(56) References Cited

U.S. PATENT DOCUMENTS

| 11,689,362 B2 * | 6/2023 | Fan ....................... H04L 9/3239 |
| | | 713/153 |
| 2015/0193774 A1 * | 7/2015 | Wetzel ................. G06Q 20/384 |
| | | 705/44 |

(Continued)

OTHER PUBLICATIONS

Sompolinsky, Yonatan et al., published "Spectre: A Fast and Scalable Cryptocurrency Protocol" in IACR Cryptology on Dec. 18, 2016, pp. 1-71.
(Continued)

*Primary Examiner* — Mehran Kamran
(74) *Attorney, Agent, or Firm* — RC Trademark Company

(57) ABSTRACT

Disclosed is a data processing system that processes data therein and a method of using the data processing system. The data processing system includes a plurality of data processing nodes that are coupled together via a data communication network arrangement. The data processing system distributes a plurality of computing tasks across plurality of data processing nodes, wherein plurality of computing tasks are distributed according to a directed acyclic graph (DAG) allocation arrangement, wherein the DAG allocation arrangement employs consensus voting arrangement employing recursive elections of nodes or users of data processing system to control operation of the DAG allocation arrangement to incentivize participation of the plurality of data processing nodes to process the plurality of computing tasks and wherein the DAG allocation arrangement is associated with a ledger arrangement operable to control or record execution of the plurality of computing tasks.

16 Claims, 3 Drawing Sheets

(51) Int. Cl.
*H04L 9/06* (2006.01)
*H04L 9/12* (2006.01)
*H04L 9/32* (2006.01)
*H04L 67/10* (2022.01)
*H04L 9/00* (2022.01)

(52) U.S. Cl.
CPC ............ *H04L 9/3239* (2013.01); *H04L 67/10* (2013.01); *H04L 9/50* (2022.05)

(58) Field of Classification Search
USPC .......................................................... 718/104
See application file for complete search history.

(56) References Cited

U.S. PATENT DOCUMENTS

| | | | |
|---|---|---|---|
| 2015/0348017 A1* | 12/2015 | Allmen | G06Q 20/367 705/76 |
| 2016/0261404 A1* | 9/2016 | Ford | H04L 67/104 |
| 2017/0212781 A1* | 7/2017 | Dillenberger | G06F 9/5038 |
| 2017/0364450 A1* | 12/2017 | Struttmann | H04L 63/123 |
| 2018/0225661 A1* | 8/2018 | Russinovich | G06F 21/53 |
| 2018/0322588 A1* | 11/2018 | Linne | G06Q 40/125 |
| 2018/0349621 A1* | 12/2018 | Schvey | H04L 63/04 |
| 2019/0036957 A1* | 1/2019 | Smith | H04L 9/3239 |
| 2019/0073688 A1* | 3/2019 | Yu | G06Q 20/387 |
| 2019/0188712 A1* | 6/2019 | Fedorov | G06F 21/53 |
| 2019/0190896 A1* | 6/2019 | Singh | H04L 63/0435 |
| 2019/0236298 A1* | 8/2019 | Agarwal | H04L 9/3239 |
| 2019/0287199 A1* | 9/2019 | Messerges | G06F 16/27 |
| 2019/0303887 A1* | 10/2019 | Wright | H04L 9/3247 |
| 2019/0347663 A1* | 11/2019 | Li | H04L 63/0428 |
| 2020/0059369 A1* | 2/2020 | Li | H04L 9/3247 |
| 2020/0175168 A1* | 6/2020 | Völp | G06F 21/71 |
| 2020/0192873 A1* | 6/2020 | Chang | H04L 9/3297 |
| 2021/0089356 A1* | 3/2021 | Simpson | H04L 9/0643 |

OTHER PUBLICATIONS

Yeow, Kimchai et al., published "Decentralized Consensus for Edge-Centric Internet of Things: A Review, Taxonomy, and Research Issues" in Special Section on Internet-of-Things (Iot) Big Data Trust Management on Dec. 6, 2017, vol. 6, 2018, pp. 1513-1524.
Popov, Serguei, published "The Tangle" in https://wiki.helloiota.com/uploads/research-whitepaper/20171025-the-tangle-1-4.pdf, dated Apr. 30, 2018, Version 1.4.3, pp. 1-28. See the whole document.
Combined Search and Examination Report issued in GB Patent Application No. GB1804836.3 on Oct. 18, 2018, 11 pages.
Notification of Transmittal of the International Search Report and Written Opinion of the International Searching Authority mailed in PCT Application No. PCT/EP2019/057471 dated Jun. 6, 2019, 16 pages.
Written Opinion of the International Preliminary Examining Authority mailed in PCT Application No. PCT/ EP2019/057471 dated Feb. 10, 2020, 07 pages.
Notification Concerning Transmittal of the International Preliminary Report on Patentability mailed in PCT Application No. PCT/EP2019/057471 dated Jun. 3, 2020, 19 pages.

* cited by examiner

DATA PROCESSING SYSTEM USING DIRECTED ACYCLIC GRAPH AND METHOD OF USE THEREOF

TECHNICAL FIELD

The present disclosure relates generally to data processing systems whose technical operation is controlled by using directed acyclic graphs. Moreover, the present disclosure relates to methods of (for) operating the aforesaid data processing systems. Furthermore, the present disclosure relates to methods of using aforesaid data processing systems for performing various data processing tasks. Additionally, the present disclosure also relates to computer readable medium containing program instructions for execution on a computer of a data processing system.

BACKGROUND

Various data processing architectures, for example RISC processing architectures, have been the subject matter of numerous granted patents issued by the KIPO, EPO and USPTO. It is desirable, in order to obtain enhanced benefit from hardware employed in data processing systems, to make operation of the data processing systems more reliable and stable, and also to reduce operating energy consumption of the data processing systems, for example to allow greater spatial packing density when the data processing systems are implemented in cloud server systems and such like. In recent times, there has arisen a worldwide network of economic activities, commercial transactions and professional interactions that has been increasingly based on a digital economy; a need arises therefore to have data processing system architectures that are efficient when processing a huge volume of transaction data arising when operating a digital economy. Specifically, the digital economy involves use of various technologies to execute a wide variety of financial transactions that previously required human intervention. Furthermore, the digital economy employs virtual currencies. Lately, the virtual currencies used in transactions and activities have evolved to include alternative currencies, digital currencies, crypto-currencies and so forth. Additionally, various types of tokens have been employed in the various technologies that provide a digital representation of value associated with a resource. Subsequently, such tokens can be used as a form of virtual currency for transactions and trading assets. Moreover, such transactions involving the use of tokens are executed, within a system programmed using known algorithms, to verify and validate every token upon generation and transaction thereof.

Conventionally, data associated with mining of a given token includes resources, such as cost, time, data processor energy dissipation, collateral and so forth, utilized during the mining. Such data has to be provided for performing a computational puzzle. Specifically, such a computational puzzle is further provided as a proof, such as a proof-of-work or a proof-of-stake, for the validation of the token. Subsequently, such proof associated with the validation of the token eliminates discrepancies such as invalid or fraudulent entries, spam, duplicity, and malware attacks. However, generation of the proof requires use of additional resources associated therewith. Moreover, the additional resources do not find much utility, are not used optimally and are mostly wasted. Furthermore, nodes of a data communication network can be used to aid the transaction of the tokens. In certain examples, the nodes of the data communication network are de-centralized, for example implemented in a loose peer-to-peer manner, and hence a significant amount of time is found in practice to be wasted when communicating various types of data between the nodes. Consequently, in a situation of a discrepancy arising, the validation of a token consumes a large amount of computing time and resources. Subsequently, such delays hamper a rate of transaction that is achievable within the data communication networks, and potentially lead to inefficient data processing and compromise an operating stability of network operations occurring within the data communication network. An impaired operating stability can affect a vulnerability to hostile attack by malicious third parties.

Traditionally, existing systems for validation of the tokens employ the additional resources, associated with the generation of the proof, for use when searching for special prime number chains and when using them as a proof-of-work. However, such a specialized application is of limited interest outside a field of research and does not find much practical implementation. Alternatively, a system that provides proof in a proof-of-space protocol has been developed to solve generalized computational problems associated with the validation of the token through a de-centralized data communication network. However, such systems do not provide any utility to the additional resources associated with the generation of the proof.

Therefore, in light of the foregoing discussion, there exists a need to overcome the aforementioned technical drawbacks of data communication system operation associated with the utility of additional resources associated with the generation of proof for a token; for example, there arises a technical problem to improve an operating stability of data communication systems that makes the data communication systems less vulnerable to hacking and data corruption to malicious activities of hostile third parties.

SUMMARY

The present disclosure seeks to provide an improved data processing system that processes data therein, wherein the data processing system includes a plurality of data processing nodes that are coupled together via a data communication network arrangement, namely to improve an operating stability of the data processing system that makes it less vulnerable to hostile attack by hostile third parties; it will be appreciated that data encryption and decryption are conventionally employed to resist hostile third party attacks.

The present disclosure also seeks to provide an improved method of (for) using a data processing system that processes data therein, wherein the data processing system includes a plurality of data processing nodes that are coupled together via a data communication network arrangement, namely to improve an operating stability of the data processing system that makes it less vulnerable to hostile attack by hostile third parties; it will be appreciated that data encryption and decryption are conventionally employed to resist hostile third party attacks.

In one aspect, an embodiment of the present disclosure provides a data processing system that processes data therein, wherein the data processing system includes a plurality of data processing nodes that are coupled together via a data communication network arrangement, characterized in that the data processing system, when in operation, distributes a plurality of computing tasks (for example, general purpose computing tasks) across the plurality of data processing nodes, wherein the plurality of computing tasks (for example, general purpose computing tasks) are distributed according to a directed acyclic graph (DAG) allocation arrangement, wherein the directed acyclic graph (DAG) allocation arrangement employs a consensus voting arrangement employing recursive elections of nodes or users of the data processing system to control operation of the directed acyclic graph (DAG) allocation arrangement to incentivize participation of the plurality of data processing nodes to process the plurality of computing tasks (for example, general purpose computing tasks) and wherein the directed acyclic graph (DAG) allocation arrangement is associated with a ledger arrangement that controls or records execution of the plurality of computing tasks (for example, general purpose computing tasks).

The invention of the present disclosure seeks is of advantage in that it provides a solution to the aforementioned problem of stable data processing system operation by addressing injudicious and suboptimal utilization of resources during validation of transactions, for example cryptocurrency transactions, wherein use of a DAG in combination with controlling or recording of computing tasks provides a reliable mechanism for ensuring stable system operation. Furthermore, the present disclosure also seeks to provide a solution to wasteful processing cost and time in providing proof for establishing a consensus for valid transactions within a data processing system.

It will be appreciated that the data communication network is implemented as a computer network, for example implementing encrypted and/or obfuscated data exchange therein for improve data security during transmission and/or storage of data. Moreover, it will be appreciated that the data communication network is implemented using interconnected computing nodes, for example wherein the computing nodes optionally perform encryption and/or decryption of data passing therethrough for making the data communication network more robust to hostile third-party attacks.

Optionally, an execution of the computing tasks (for example, general purpose computing tasks, for example performing data encryption or data decryption, hash generation and such like) and subsequent verification thereof is employed to conduct elections to establish a consensus for the ledger arrangement recording entries that are representative of a state of the data processing system and/or its data.

Optionally, the plurality of data processing nodes is incentivized to execute the plurality of computing tasks (for example, general purpose computing tasks) by any one of: being rewarded with tokens, being enabled to participate in the consensus governing the ledger arrangement.

Optionally, the data processing system comprises processing of tokens, wherein the processing of tokens is any one of: for specifying a particular problem instance, for defining a metadata associated with problem instance.

More optionally, the ledger arrangement is any one of: public, private.

Optionally, the ledger arrangement operates to encrypt data and to store the encrypted data when recording blockchain transactions, to increase robustness of the data processing system to hacking.

Optionally, each of the plurality of data processing nodes provides a deposit to earn a right to process the plurality of computing tasks (for example, general purpose computing tasks), wherein the deposit is refunded to corresponding data processing node at a time when the data processing node withdraws from the data processing system.

Optionally, the deposit is a security to ensure non-fraudulent execution of the plurality of computing tasks (for example, general purpose computing tasks).

Optionally, the directed acyclic graph (DAG) allocation arrangement is operable to establish proof for next block and the plurality of data processing nodes is configured to obtain votes for a candidate node, wherein the candidate node upon winning becomes an elected leader related to the next block.

More optionally, a reward is provided to the elected leader for closing the block, the reward is calculated as a product of a total work captured between current proof and a previous proof, an incentive multiplier, a sharing fraction and a conversion rate of work into incentive token.

Optionally, a candidate node having second highest votes is operable to close the block after a predetermined time period. Optionally, a candidate node having $n^{th}$ highest votes is operable to close the block after a predetermined time period, wherein "n" is an integer greater than 2.

Optionally, a synchronization mechanism establishes a relationship between the directed acyclic graph (DAG) allocation arrangement and the ledger arrangement.

Optionally, each of the plurality of data processing nodes provides a smart proof by executing the plurality of general purpose computing tasks.

More optionally, the smart proof provided by each of the plurality of data processing nodes is broadcasted to the remaining plurality of data processing nodes.

Optionally, the plurality of data processing nodes is operable to solve hash-puzzle based proofs.

Optionally, in the system, the plurality of general-purpose computing tasks are distributed according to a chain; optionally, the chain defines a temporal sequence or series in which the computing tasks are to be executed, for example in an event that later computing tasks are dependent upon processed output results from earlier computing tasks.

In another aspect, an embodiment of the present disclosure provides a method of (for) using a data processing system that processes data therein, wherein the data processing system includes a plurality of data processing nodes that are coupled together via a data communication network arrangement, characterized in that the method includes:

(a) using the data processing system to distribute a plurality of general purpose computing tasks across the plurality of data processing nodes, wherein the plurality of general purpose computing tasks is distributed according to a directed acyclic graph (DAG) allocation arrangement; and (b) arranging for the directed acyclic graph (DAG) allocation arrangement to employ a consensus voting arrangement employing recursive elections of nodes or users of the data processing system to control operation of the directed acyclic graph (DAG) allocation arrangement to incentivize participation of the plurality of data processing nodes to process the plurality of general purpose computing tasks, wherein the directed acyclic graph (DAG) allocation arrangement is associated with a ledger arrangement operable to control or record execution of the plurality of general purpose computing tasks.

Optionally, the method includes executing and verifying the general-purpose computing tasks employed to conduct elections to establish a consensus for the ledger arrangement recording entries that are representative of a state of the data processing system and/or its data.

Optionally, the method includes incentivizing the plurality of data processing nodes to execute the plurality of general purpose computing tasks by any one of: being rewarded with tokens, being enabled to participate in the consensus governing the ledger arrangement.

More optionally, the data processing system comprises processing of tokens, wherein the processing of tokens is any one of: for specifying a particular problem instance, for defining a metadata associated with problem instance.

Optionally, the ledger arrangement is any one of: public, private.

Optionally, the ledger arrangement operates to encrypt data and to store the encrypted data when recording blockchain transactions, to increase robustness of the data processing system to hacking.

Optionally, the each of the plurality of data processing nodes provides a deposit to earn a right to process the plurality of general purpose computing tasks, wherein the deposit is refunded to corresponding data processing node at a time when a specific data processing node withdraws from the data processing system.

Optionally, the deposit is a security to ensure non-fraudulent execution of the plurality of general purpose computing tasks.

More optionally, the directed acyclic graph (DAG) allocation arrangement is operable to establish proof for next block and the plurality of data processing nodes is configured to obtain votes for a candidate node, wherein the candidate node upon winning becomes an elected leader related to the next block.

Optionally, a synchronization mechanism establishes a relationship between the directed acyclic graph (DAG) allocation arrangement and the ledger arrangement.

Optionally, the method includes providing a reward for closing the block to the elected leader, the reward is calculated as a product of a total work captured between current proof and a previous proof, an incentive multiplier, a sharing fraction and a conversion rate of work into incentive token.

Optionally, the method includes closing the block by a candidate node having second highest votes after a predetermined time period.

Optionally, the method includes providing a smart proof by the plurality of data processing nodes by executing the plurality of general purpose computing tasks.

More optionally, the smart proof provided by each of the plurality of data processing nodes is broadcasted to the remaining plurality of data processing nodes.

Optionally, in the method, the plurality of data processing nodes solves hash-puzzle based proofs.

Optionally, the method includes distributing the plurality of general purpose computing tasks according to a chain; optionally, the chain defines a temporal sequence or series in which the computing tasks are to be executed, for example in an event that later computing tasks are dependent upon processed output results from earlier computing tasks.

In yet another aspect, an embodiment of the present disclosure provides a computer program product comprising a non-transitory computer-readable storage medium having computer-readable instructions stored thereon, the computer-readable instructions being executable by a computerized device comprising processing hardware to execute the method of (for) using a data processing system that processes data therein.

The present disclosure provides a data processing system and a method of using the data processing system. The described system provides an improved way, for example an optimal way, of establishing a general consensus associated with tokens and transactions thereof within the system. Furthermore, the described system also provides an approach to utilize processing cost and time spent in providing proof for establishing authenticity of work done within the system. Furthermore, use of directed acyclic graphs to implement provides a scalable structure to the system. Consequently, the system is able to accommodate an increase in participation of users in the system. Additionally, the system further increases the number of transactions executed per unit time. The system also provides an improved solution, for example an optimal solution, to avoid staling of blocks within the system and subsequently reducing a loss caused to owners of the blocks. Moreover, the scalable structure provides a stable network operation within the system and hence increasing effectiveness and reliability of the system for establishing a consensus for carrying out transactions and other operations within the data processing system.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
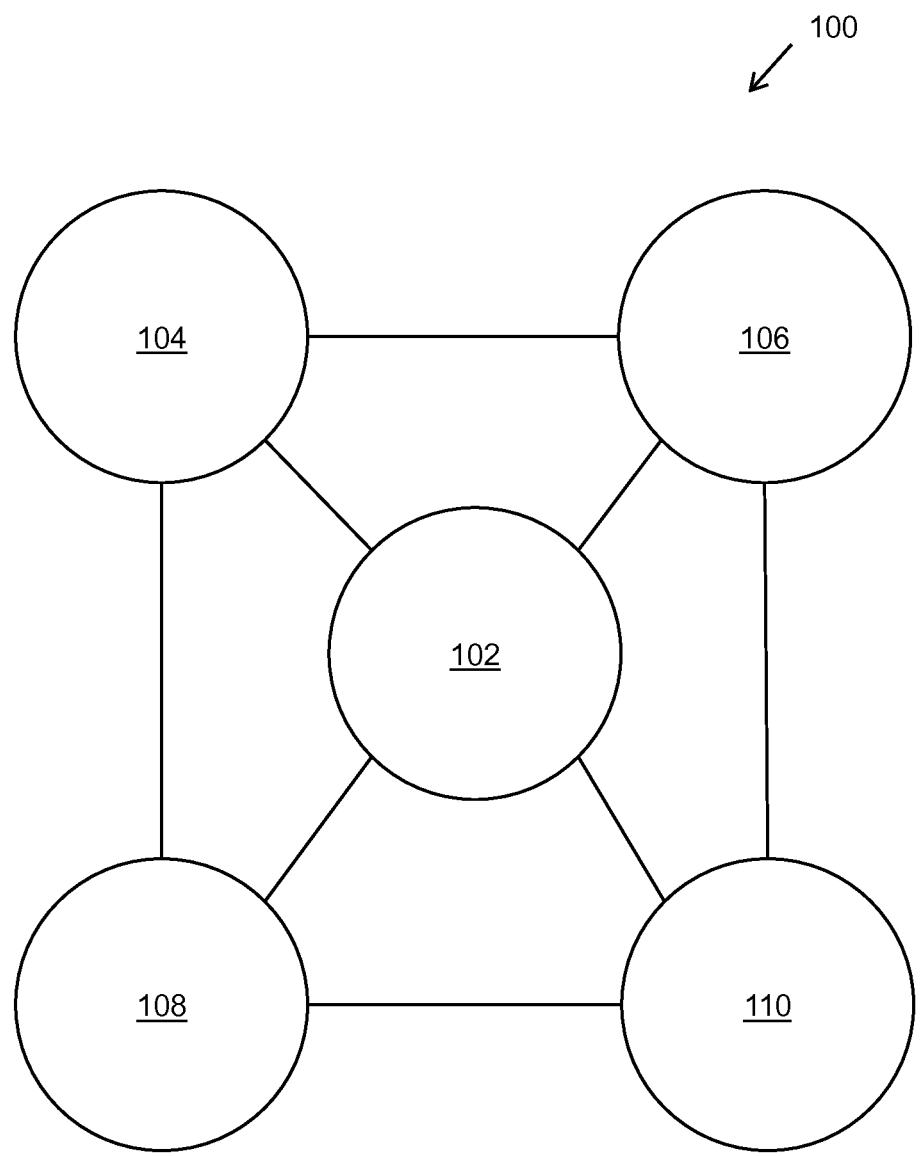
FIG. 1 is an illustration of a data processing system that processes data therein, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a data processing system that processes data therein, wherein the data processing system includes a plurality of data processing nodes that are coupled together via a data communication network arrangement, characterized in that the data processing system, when in operation, distributes a plurality of general purpose computing tasks across the plurality of data processing nodes, wherein the plurality of general purpose computing tasks are distributed according to a directed acyclic graph (DAG) allocation arrangement, wherein the directed acyclic graph (DAG) allocation arrangement employs a consensus voting arrangement employing recursive elections of nodes or users of the data processing system to control operation of the directed acyclic graph (DAG) allocation arrangement to incentivize participation of the plurality of data processing nodes to process the plurality of general purpose computing tasks, and wherein the directed acyclic graph (DAG) allocation arrangement is associated with a ledger arrangement that controls or records execution of the plurality of general purpose computing tasks.

It will be appreciated that the data communication network is implemented as a computer network, for example implementing encrypted and/or obfuscated data exchange therein for improve data security during transmission and/or storage of data. Moreover, it will be appreciated that the data communication network is implemented using interconnected computing nodes, for example wherein the computing nodes optionally perform encryption and/or decryption of data passing therethrough for making the data communication network more robust to hostile third-party attacks.

In another aspect, an embodiment of the present disclosure provides a method of (for) using a data processing system that processes data therein, wherein the data processing system includes a plurality of data processing nodes that are coupled together via a data communication network arrangement, characterized in that the method includes:

(a) using the data processing system to distribute a plurality of general purpose computing tasks across the plurality of data processing nodes, wherein the plurality of general purpose computing tasks is distributed according to a directed acyclic graph (DAG) allocation arrangement; and (b) arranging for the directed acyclic graph (DAG) allocation arrangement to employ a consensus voting arrangement employing recursive elections of nodes or users of the data processing system to control operation of the directed acyclic graph (DAG) allocation arrangement to incentivize participation of the plurality of data processing nodes to process the plurality of general purpose computing tasks, wherein the directed acyclic graph (DAG) allocation arrangement is associated with a ledger arrangement that controls or records execution of the plurality of general purpose computing tasks.

Throughout the present disclosure the term "data processing system" refers to a de-centralized system (namely a distributed system, for example a spatially distributed system spread over several countries or continents) for establishing a consensus among a plurality of data processing nodes included therein. The plurality of data processing nodes performs transactions of tokens, resources and so forth therebetween; for example, the transactions include exchanging tokens. Furthermore, the term "de-centralized system" refers to an arrangement wherein the plurality of data processing nodes (such as a processor, server and so forth) are spatially-separated from one another (such as, located at different locations, for example as aforementioned). Furthermore, the data processing system shares data processing capabilities of each of the spatially-separated data processing nodes. Moreover, the plurality of data processing nodes is capable of initiating and performing transactions associated with one or more tokens, resources and so forth and subsequently, updating one or more records related to the transactions. Additionally, the plurality of data processing nodes is capable of validating the transactions and the records related therewith. However, it will be appreciated that the transactions are executed within the systems that result in an improved system operating stability, reduced power dissipation within the systems, faster response times within the systems, reduced data transmission propagation delays within the system, and so forth. Improved system operation stability is a very important characteristic of technical operation of the system to make it robust against malicious attacks by third parties. In an event that the system becoming uncoordinated or unsynchronized in its operation in any way, there arise vulnerabilities that malicious third parties are able potentially to exploit to make false block-chain entries.

Throughout the present disclosure, the term "transactions" refers to exchange of services, information and so forth between two or more data processing nodes. Such a transaction may involve (notional) remuneration of the one or more resources by one entity associated with one data processing node, for services offered by another entity associated with another data processing node. Furthermore, the entities of the one or more resources may be parties (such as owners) that hold control of the resources in the data processing system. Furthermore, one or more transactions have one or more records related thereto. Specifically, the records may be data, facts, logs and other details associated with the one or more transactions. For example, the records can contain information associated with one or more resources utilized during the transactions. Moreover, the records may be maintained in a list, a stack, a double-ended-queue, Merkle tree, a binary tree or any other data structure suitable for storing the records. Specifically, each record in the data structure is associated to any one of the one or more transactions. Additionally, the plurality of data processing nodes is coupled to each other through a data communication network arrangement for executing such transactions.

Moreover, the data processing system processes data therein, wherein the data processing system includes the plurality of data processing nodes that are coupled together via the data communication network arrangement. Furthermore, each of the plurality of data processing nodes is capable of communicating with other data processing nodes via the data communication network arrangement, in order to perform the transactions and maintain the records associated therewith. Such a data communication network arrangement relates to an arrangement of interconnected, programmable and/or non-programmable components that are configured to facilitate data communication between one or more electronic devices and/or databases, whether available or known at the time of filing or as later developed; for example, the components include digital hardware such as FPGA, custom-designed digital interfaces, encrypted databases and so forth. Furthermore, the data communication network arrangement may include, but is not limited to, a peer-to-peer (P2P) network, a hybrid peer-to-peer network, local area networks (LANs), radio access networks (RANs), metropolitan area networks (MANs), wide area networks (WANs), all or a portion of a public network such as the global computer network known as the Internet, a private network, a cellular network and any other communication system or systems located at one or more locations. Additionally, the data communication network arrangement employs wired or wireless communication that can be carried out via any number of known protocols, including, but not limited to, Internet® Protocol (IP), Wireless Access Protocol (WAP), Frame Relay, or Asynchronous Transfer Mode (ATM). Moreover, any other suitable protocols using voice, video, data, or combinations thereof, can also be employed. Moreover, although the system is frequently described herein as being implemented with TCP/IP communication protocols, the system may also be implemented using IPX®, Appletalk®, IP-6®, NetBIOS®, OSI®, any tunnelling protocol (e.g. IPsec®, SSH®), or any number of existing or future protocols.

In an embodiment, the data communication network arrangement is implemented as a distributed peer-to-peer (P2P) network of interconnected plurality of data processing nodes. Specifically, the distributed peer-to-peer network may be capable of performing transactions directly between entities (such as owners) corresponding to the one or more resources. Furthermore, such transactions require a consensus (namely, agreement) of the plurality of data processing nodes related to transactions.

Throughout the present disclosure the term "data processing nodes" relates to a computational element that is operable to respond to and processes instructions that drive the data processing system. Optionally, the data processing nodes includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "data processing nodes" may refer to one or more individual processors, processing devices and various elements associated with a processing device that may be shared by other processing devices. Additionally, the one or more individual data processing nodes, processing devices and elements are arranged in various architectures for responding to and processing the instructions that drive the system. For example, the processing devices and elements are arranged in adaptively changing configurations that are iteratively reconfigured by control logic to obtain most efficient data processing throughout therethrough as a function of energy dissipation therein. Such iterative reconfiguring is achieved by making an incremental change in device configuration and observing any improvement in data processing performance (for example a reduction in data processor power dissipation of processor cycles required for completing a given data processing task), assuming a pseudo-constant data processing task workload.

Throughout the present disclosure the term "consensus" refers to a specific set of rules that the plurality of data processing nodes unfailingly enforce in order to validate tokens and transactions thereof. Furthermore, the consensus regarding transactions relates to general agreement of the plurality of data processing nodes related to the transactions being executed in the data processing system. Additionally, such consensus is reached by providing a proof of work, proof of stake or voting by the plurality of data processing nodes.

Furthermore, the data processing system distributes the plurality of general purpose computing tasks across the plurality of data processing nodes. Specifically, the plurality of data computing nodes solves the general-purpose computing tasks in order to establish consensus within the data processing system for executing transactions. Moreover, such general-purpose computing tasks include intelligent interfaces, machine learning tasks, image processing, DNA sequence alignment, speech recognitions, protein folding identification or any other computational problem. In an example embodiment, solutions of such general-purpose computing tasks may be used for other purposes within or outside the data processing system, for example for performing data encryption and data decryption tasks. Moreover, the plurality of general purpose computing tasks is distributed according to the directed acyclic graph (DAG) allocation arrangement. Specifically, the directed acyclic graph (DAG) allocation arrangement uses a directed acyclic graph to track and verify execution of the plurality of general purpose computing tasks. Additionally, the directed acyclic graph is a finite directed graph with no directed cycles. Furthermore, the directed acyclic graph (DAG) allocation arrangement uses the directed acyclic graph to record proofs that the general-purpose computing tasks have been executed. In an example embodiment, the general-purpose computing tasks may be micro programs that use other micro programs that in turn together form a larger program; for example, the micro programs, likewise their execution, is handled in a hierarchical manner. In such an example, set of parameters for such micro programs may be located in the directed acyclic graph (DAG) allocation arrangement.

Optionally, each of the plurality of data processing nodes provides a smart proof by executing the plurality of general purpose computing tasks. Furthermore, the plurality of general purpose computing tasks may be defined by participants of the data processing system; for example, the participants may have specialist types of computing resources at their disposal, for example array processors or even artificial intelligence (AI) computing engines comprising a hierarchical configuration of pseudo-analog variable state machines implemented in an array processor including a plurality of RISC processors. Consequently, proof of executing such general-purpose computing tasks may be referred to as smart proofs as it may be programmable. In an embodiment, the ledger arrangement may be a source of computationally useful problems such as estimating the probability, using machine learning (for example, AI processing as aforementioned using pseudo-analog variable state machines) or statistical inference of a particular provisional entry to the ledger being incorporated into the global consensus and so forth. More optionally, the smart proof provided by each of the plurality of data processing nodes is broadcasted to the remaining plurality of data processing nodes. At an instance, the smart proofs may be communicated with each of participants of the data processing system. Subsequently, such smart proofs may be used to increase confidence in blocks of the ledger arrangement and thereby improve transaction acceptance rates.

Alternatively, optionally, the plurality of data processing nodes is operable to solve hash-puzzle based proofs. Furthermore, in absence of sufficient number of smart proofs, the plurality of data processing nodes may solve hash-puzzle based proofs in order to propose transactions in the ledger arrangement. Such hash-puzzle proofs can be used for verification and validation purposes.

Optionally, the plurality of general computing tasks may be performed on a plurality of virtual machines such as a FPGA or ASIC based data processing nodes. The data processing nodes may contain a set of instructions that may be combined to run general-purpose Turing-complete algorithms. The main purpose of each of the data processing nodes may be to provide proof that allows other data processing nodes in the network to verify that instructions in the general computing tasks have been performed correctly by the specific data processing node (namely, a prover) proposing the proof. The verification of proof provided by each of the plurality of data processing nodes may have two possible alternative methods. In one embodiment, the two following methods are complementary and both present. In another embodiment, either of the two methods are used.

Specifically, the plurality of data processing nodes may need to follow a protocol agreed by the P2P network. Furthermore, the first method is a hash-based system that requires verifying data processing nodes to perform a sequence of operations identical to the prover data processing node that is proposing successful execution of general purpose computing task. The second method, based on zero knowledge protocols, allows correct program execution to be verified by performing a non-identical and less computationally expensive verification calculation. The second method may involve communication between the plurality of data processing nodes that perform verification by executing the general-purpose computing tasks and the prover.

More optionally, a plurality of registers within the plurality of data processing nodes that represent variables from intermediate steps in the plurality of general purpose computing tasks are used as inputs to a hash function. Furthermore, output hash-value of the hash function of each register then may be combined with hash-value from previous step using another hash function, which could be a simple logic operation or another hash function. Moreover, this process may be repeated until the general-purpose computing task terminates. The hash values from each register may be then concatenated and used as inputs to another hash function, such as SHA-256, with output values serving as a fixed-width verification key for the general-purpose computing tasks. The plurality of data processing nodes that may have completed execution of the general-purpose computing tasks successfully may share verification key thereof to check that they have run identical programs. This process may incorporate register sub-sampling, vector processing operations or other optimization techniques that may decrease cost of computing the verification without compromising security.

Furthermore, optionally, the general computing tasks may be independent of architecture and configuration of the plurality of data processing nodes. Furthermore, instructions for the plurality of general purpose computing tasks may be written in of high-level assembly language that may be translated into machine code depending on capabilities of the plurality of data processing nodes and instruction set thereof. This high-level assembly language may include instructions to manipulating matrices, accessing and writing files or parts of the file of the general purpose computing tasks, accessing the ledger arrangement, accessing and writing to the directed acyclic graph (DAG) allocation arrangement and/or accessing and writing to a persistent (namely, permanent) data store (namely, database).

Furthermore, the directed acyclic graph (DAG) allocation arrangement employs the consensus voting arrangement employing recursive elections of nodes or users of the data processing system. Additionally, the consensus voting arrangement recursively elects a leader from the plurality of data processing nodes, every time a processing of general purpose computing tasks is performed to establish consensus. Furthermore, the consensus voting arrangement involves the proofs established in the directed acyclic graph (DAG) allocation arrangement and votes towards candidate nodes in order to elect the leader.

Furthermore, the consensus voting arrangement control operation of the directed acyclic graph (DAG) allocation arrangement to incentivize participation of the plurality of data processing nodes to process the plurality of general purpose computing tasks. The consensus voting arrangement monitors proof of executing general purpose computing tasks and further obtains votes for each of the plurality of data processing nodes performing the general-purpose computing tasks. Additionally, the consensus voting arrangement incentivizes each of the plurality of data processing nodes based on proofs provided by them and processing and time complexity of the plurality of general purpose computing tasks performed by each of the plurality of data processing nodes.

Optionally, the directed acyclic graph (DAG) allocation arrangement is operable to establish a proof for a next block and the plurality of data processing nodes is configured to obtain votes for a candidate node, wherein the candidate node upon winning becomes an elected leader related to the next block. Furthermore, the directed a cyclic graph (DAG) keeps track of the plurality of general purpose computing tasks performed by each of the plurality of data processing nodes for electing leader data processing node for subsequent block period. Subsequently, each of the candidate nodes from the plurality of data processing nodes receives a vote for each proof provided thereby for executing the general-purpose computing tasks. Consequently, any of the plurality of data processing nodes having maximum number of votes is elected as the leader of the subsequent (namely, following) block period. Additionally, the elected leader may have a right to decide on consensus and blocks to be entered in the ledger arrangement.

Furthermore, the directed acyclic graph (DAG) allocation arrangement is associated with the ledger arrangement operable to control or record execution of the plurality of general purpose computing tasks. Specifically, the ledger arrangement is a sequential database that includes blocks of information to be used in establishing consensus within the data processing system. Furthermore, the ledger arrangement stores proofs of execution of the plurality of general purpose computing programs by the plurality of data processing nodes. Additionally, the ledger arrangement is associated to the directed acyclic graph (DAG) allocation arrangement in order to synchronize the execution of plurality of general purpose computing tasks by the plurality of data processing nodes with proofs established thereby. Beneficially, the association between the directed acyclic graph (DAG) allocation arrangement and the ledger arrangement substantially eliminates time and processing required for establishing proof by performing general purpose computing tasks for authentication every time a transaction is performed.

Optionally, a synchronization mechanism establishes a relationship between the directed acyclic graph (DAG) allocation arrangement and the ledger arrangement. Furthermore, the synchronization mechanism establishes a relationship between any part of the directed acyclic graph (DAG) allocation arrangement and a specific block in the ledger arrangement. This may be achieved by entering proof of next block into the directed acyclic graph (DAG) allocation arrangement.

Optionally, the ledger arrangement is any one of: public, private. Furthermore, the ledger arrangement with public (namely, without permission, or "unpermissioned") control of access may be open for every participant such as a data processing node, a user, an entity and the like that determines validity of execution of the plurality of general purpose computing tasks. Alternatively, the ledger arrangement with private (namely, with permission, or "permissioned") control of access may have an access control layer implemented therein. Specifically, participants may have a control over who can join the data processing system and who can participate in establishing consensus within the system. Additionally, such ledger arrangement may have access protection rights with defined constraints regarding rights to be exploited by the participants.

Optionally, each of the plurality of data processing nodes provides a deposit to earn a right to process the plurality of general purpose computing tasks, wherein the deposit is refunded to corresponding data processing node at a time when the data processing node withdraws from the data processing system. Furthermore, each of the plurality of data processing node may provide a predefined deposit of tokens (namely, resources, processing cost and so forth). Additionally, providing such deposit may make the plurality of data processing nodes eligible to participate in data processing within the system. In an example embodiment, when any of the plurality of data processing node attempts to stop data processing, the deposit provided by the specific data processing node may be returned (namely, refunded) thereto. More optionally, the deposit is a security to ensure non-fraudulent execution of the plurality of general purpose computing tasks. In an example embodiment, when any of the plurality of data processing node attempts an invalid (namely, unauthentic) processing, the specific data processing node may get deprived of the deposit provided thereby.

Optionally, execution of the general-purpose computing tasks and subsequent verification thereof is employed to conduct elections to establish the consensus for the ledger arrangement recording entries that are representative of a state of the data processing system and/or its data. Furthermore, elections among the plurality of data processing nodes are carried out in order to reach a general agreement regarding state of the data processing system. In an example, each block in the ledger arrangement may have an associated state that can be verified through a hash. The state keeps track of proofs and parameter sets related to the general-purpose computing tasks. Specifically, the parameter sets related to the general-purpose programs may be a core part of the ledger arrangement. Alternatively, the ledger arrangement may be programmable to implement parameter sets related to the general-purpose computing tasks.

More optionally, the plurality of data processing nodes is incentivized to execute the plurality of general purpose computing tasks by any one of: being rewarded with tokens, being enabled to participate in the consensus governing the ledger arrangement. Furthermore, such tokens provided to the plurality of data processing nodes may have an equal processing cost as the processing cost of the performed general purpose computing tasks. Moreover, the plurality of data processing nodes is incentivized for executing the general-purpose computing tasks by being promoted to take part in working of the consensus voting arrangement by casting votes for the plurality of data processing nodes, obtaining votes for the plurality of data processing nodes and so forth. The elected leader may be incentivized by providing rewards.

Optionally, a reward is provided to the elected leader for closing the block. The reward is calculated as a product of a total work captured between current proof and a previous proof, an incentive multiplier, a sharing fraction and a conversion rate of work into incentive token. Furthermore, the elected leader may close the block by providing a proof associated with execution of the plurality of general computing tasks. Consequently, the elected leader may be awarded for closing the block by providing tokens or by getting promoted within the system. At an instance, promotion as reward may be in form of advanced access rights within the data processing system. Moreover, the total work captured between current proof and a previous proof may be total processing done for obtaining the current proof. Additionally, the incentive multiplier may be a maximum path distance between the current proof and the previous proof (namely, proof-to-proof depth). At an instance, the incentive multiplier may be hard coded in the data processing system. Furthermore, sharing fraction may provide a ratio of splitting incentives among the workers and the elected leader during a block period. In an example, if the elected leader publishes proof and closes the block in a small fraction of block period, no reward is provided to the elected leader as a small amount of processing performed in the specific block period. In another example, when the elected leader is unable to close the block, the reward may reduce to zero and block period may become too long. It is to be understood that only a limited amount of reward is available during one block period. Consequently, the plurality of data processing nodes tries to perform maximum processing before the maximum reward is reached. Additionally, the plurality of data processing nodes may attempt to fast short problems after the maximum reward is reached in order to minimize a share of the elected leader in the reward.

More optionally, a candidate node having second highest votes is operable to close the block after a predetermined time period. Furthermore, at an instance, when the elected node may be unable to close the block by providing proof of work, then the candidate node having second highest votes during previous block period may be able to close the block by providing proof of executing the plurality of general computing tasks. Additionally, the candidate node may be incentivised for closing the block. Moreover, this may be done to further incentivise building depth of the directed acyclic graph (DAG) allocation arrangement and to make the data processing system robust against leaders abandoning posts thereof. Additionally, the candidate may be able to close the block after predefined period of time. Optionally, at an instance the candidate with second highest vote may not be able to close the block, candidate with third highest vote may be able to close the block after a second predefined time. In an example, the predefined time may be 0.75% of the block period or any other geometric series may also be used to determine the predefined time.

Moreover, optionally, no leader may be elected and consensus may be established by voting of the plurality of data processing nodes and participants of the data processing system. It may be similar to a principle of electing the leaders with a time delay. Additionally, the time delay may be measured in blocks added to the ledger arrangement between proofs being registered on the directed acyclic graph (DAG) allocation arrangement and votes being cast.

Furthermore, optionally, the data processing system comprises processing of tokens, wherein the processing of tokens is any one of: for specifying a particular problem instance, for defining a metadata associated with a problem instance (example, task). Furthermore, such processing of tokens may be transactions of tokens between two or more the plurality of data processing nodes. Additionally, processing may further define constraints for executing the transactions. Moreover, the processing of tokens may specify input data for the plurality of general purpose computing tasks. Furthermore, the metadata associated with the general-purpose computing tasks may include a hash and compliance with a particular general-purpose computing task and it may include a method of transferring tokens.

The present description also relates to the method as described above. The various embodiments and variants disclosed above apply mutatis mutandis to the method.

Optionally, the method includes executing and verifying the general-purpose computing tasks employed to conduct elections to establish a consensus for the ledger arrangement recording entries that are representative of a state of the data processing system and/or its data.

Optionally, the method includes incentivizing the plurality of data processing nodes to execute the plurality of general purpose computing tasks by any one of: being rewarded with tokens, being enabled to participate in the consensus governing the ledger arrangement.

More optionally, the data processing system comprises processing of tokens, wherein the processing of tokens is any one of: for specifying a particular problem instance, for defining a metadata associated with problem instance.

Optionally, the ledger arrangement is any one of: public, private. Optionally, the ledger arrangement is operable to switch dynamically between a public manner of operation and a private manner of operation, depending upon data communication network operating conditions, for example as a trusted status of nodes of the data communication network vary as a function of time.

Optionally, the each of the plurality of data processing nodes provides a deposit to earn a right to process the plurality of general purpose computing tasks, wherein the deposit is refunded to corresponding data processing node at a time when a specific data processing node withdraws from the data processing system.

Optionally, the deposit is a security to ensure non-fraudulent execution of the plurality of general purpose computing tasks.

More optionally, the directed acyclic graph (DAG) allocation arrangement is operable to establish proof for next block and the plurality of data processing nodes is configured to obtain votes for a candidate node, wherein the candidate node upon winning becomes an elected leader related to the next block.

Optionally, a synchronization mechanism establishes a relationship between the directed acyclic graph (DAG) allocation arrangement and the ledger arrangement.

Optionally, the method includes providing a reward for closing the block to the elected leader, the reward is calculated as a product of a total work captured between current proof and a previous proof, an incentive multiplier, a sharing fraction and a conversion rate of work into incentive token.

Optionally, the method includes closing the block by a candidate node having second highest votes after a predetermined time period.

Optionally, the method includes providing a smart proof by the plurality of data processing nodes by executing the plurality of general purpose computing tasks.

More optionally, the smart proof provided by each of the plurality of data processing nodes is broadcasted to the remaining plurality of data processing nodes.

Optionally, the plurality of data processing nodes solves hash-puzzle based proofs.

Optionally, the data processing system includes a plurality of data processing nodes that are coupled together via a data communication network arrangement, characterized in that the data processing system distributes a plurality of special purpose computing tasks. Optionally, the method includes distributing a plurality of special purpose computing tasks within the system. More optionally, the embodiments of the present invention apply mutatis mutandis when 'general purpose computing tasks' are replaced with 'special purpose computing tasks', where 'special purpose computing tasks' are computing tasks which are not for general purpose computing, for example computing tasks that have special requirements that require them to be processed by a specific given node, for example a specific given node that has access to sensor data that is spatially local thereto.

Furthermore, there is disclosed a computer program product comprising a non-transitory computer-readable storage medium having computer-readable instructions stored thereon, the computer-readable instructions being executable by a computerized device comprising processing hardware to execute the method of (for) using a data processing system that processes data therein.

Optionally, the computer readable medium comprises one of a floppy disk, a hard disk, a high capacity read only memory in the form of an optically read compact disk or CD-ROM, a DVD, a tape, a read only memory (ROM), and a random-access memory (RAM).

DETAILED DESCRIPTION OF THE DRAWINGS

Referring to FIG. 1, there is shown an illustration of a data processing system 100 that processes data therein, in accordance with an embodiment of the present disclosure. The data processing system 100 includes a plurality of data processing nodes 102, 104, 106, 108 and 110 that are coupled together via a data communication network arrangement.

Figure 2:
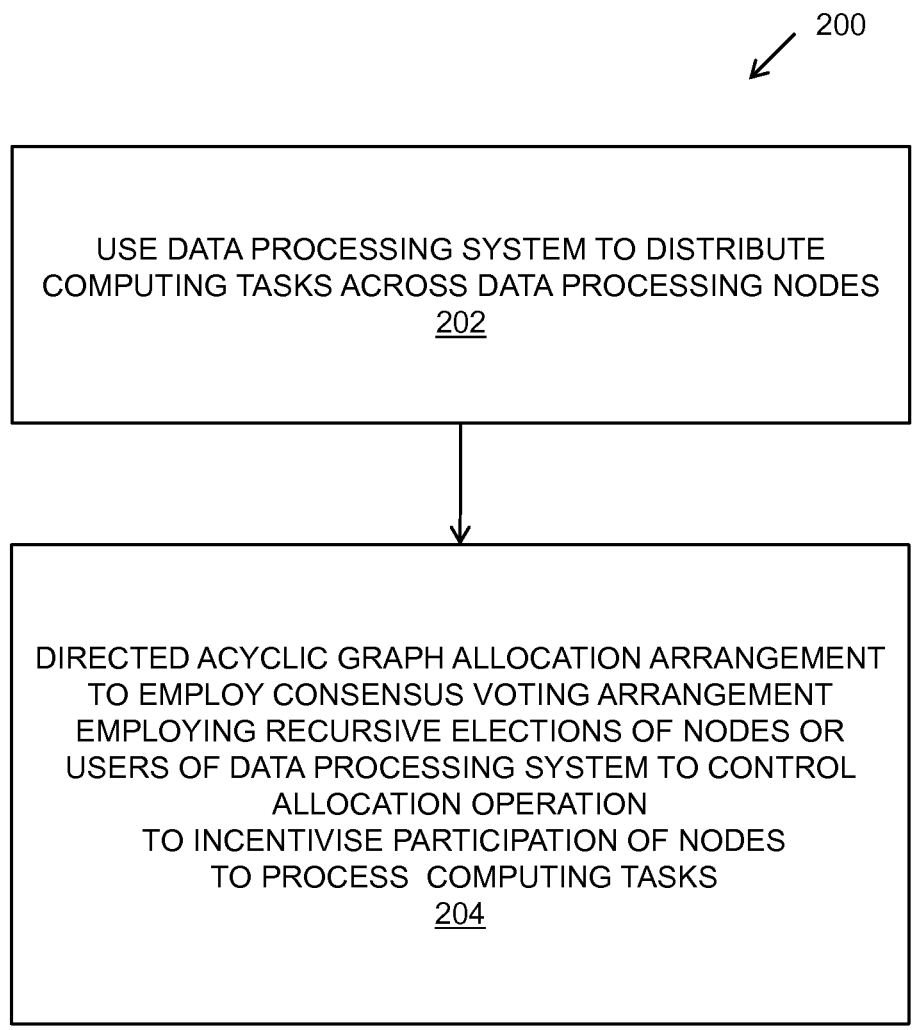
FIG. 2 is an illustration of steps of a method (of) for using a data processing system that processes data therein, in accordance with an embodiment of the present disclosure.

Referring to FIG. 2, there is shown an illustration of steps of a method 200 for using a data processing system that processes data therein, in accordance with an embodiment of the present disclosure. Furthermore, in the method 200, the data processing system includes a plurality of data processing nodes that are coupled together via a data communication network arrangement. At a step 202, the data processing system is used to distribute a plurality of general purpose computing tasks across the plurality of data processing nodes. Additionally, the plurality of general purpose computing tasks is distributed according to a directed acyclic graph (DAG) allocation arrangement. At a step 204, a system is arranged for the directed acyclic graph (DAG) allocation arrangement to employ a consensus voting arrangement. Furthermore, the consensus voting arrangement employs recursive elections of nodes or users of the data processing system. Additionally, the data processing system controls the operation of the directed acyclic graph (DAG) allocation arrangement to incentivize participation of the plurality of data processing nodes to process the plurality of general purpose computing tasks. Moreover, the directed acyclic graph (DAG) allocation arrangement is associated with a ledger arrangement controls or records (namely, is operable to control or record) execution of the plurality of general purpose computing tasks.

The steps 202 to 204 are only illustrative and other alternatives can also be provided where one or more steps are added, one or more steps are removed, or one or more steps are provided in a different sequence without departing from the scope of the claims herein.

Figure 3:
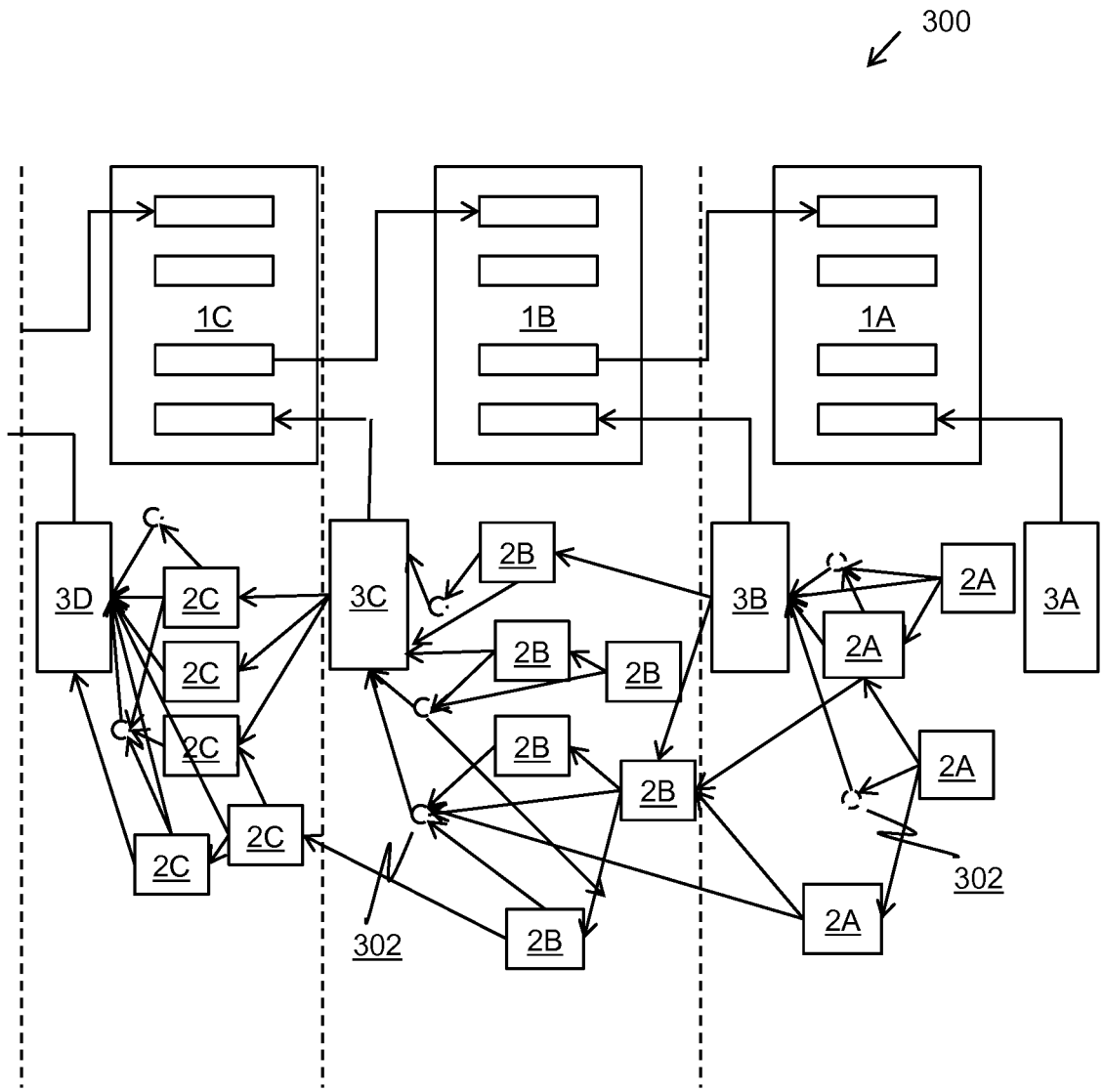
FIG. 3 is an illustration of the method (of) for using the data processing system, in accordance with an embodiment of the present disclosure.

Referring to FIG. 3, there is shown an exemplary implementation 300 of the method of using the data processing system 100 (as shown in FIG. 1). Furthermore, the blocks 1A, 1B and 1C are blocks forming the ledger arrangement. Specifically, each block points to a previous block thereof within the ledger arrangement that is block 1C points to previous block 1B and further 1B points to 1A. Additionally, dashed lines in the figure show a block period (namely, block time). In each of the block periods a data processing node is elected as a leader that is operable to decide a consensus for next block to be entered in the ledger arrangement. Furthermore, data processing node 3A is an elected leader for the block period associated with the block 1A. Moreover, votes 302 (shown by dashed circles) for plurality of data processing nodes is provided based on plurality of proofs 2A provided by the plurality of data processing nodes. Subsequently, such votes 302 (shown by dashed circles) are used to elect a leader 3B for next block period. The elected leader 3A is operable to close the block 1A by publishing proof of work thereof. Furthermore, the elected leader 3B in the block period associated with block 1B and other plurality of data processing nodes may provide proofs 2B of performing plurality of general purpose computing tasks. Moreover, based on proofs, votes for electing leader for next block 1C are casted. The elected leader 3B is operable to close the block 1B by publishing proof of work thereof. Subsequently, 3C is elected as leader for block period associated with block 1C. Moreover, votes (shown by dashed circles) for plurality of data processing nodes is provided based on plurality of proofs 2C provided by the plurality of data processing nodes. Subsequently, such votes (shown by dashed circles) are used to elect a leader 3D for next block period (not shown). The elected leader 3C for block 1C is operable to close the block 1C by publishing proof of work thereof.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A data processing system comprising a plurality of data processing nodes that are coupled together via a data communication network arrangement, an allocation arrangement for allocation of a plurality of computing tasks, a ledger arrangement, wherein:
   the allocation arrangement is a directed acyclic graph allocation arrangement;
   the data processing system, when in operation, is configured to distribute the plurality of computing tasks across the plurality of data processing nodes according to the directed acyclic graph allocation arrangement;
   the directed acyclic graph allocation arrangement is configured to track and verify the execution of the plurality of computing tasks
   the directed acyclic graph allocation arrangement is configured to employ a consensus voting arrangement;
   the consensus voting arrangement is configured to employ recurring elections of data processing nodes to control operation of the directed acyclic graph allocation arrangement wherein the control of the operation of the directed acyclic graph allocation arrangement provides incentives for the plurality of data processing nodes to process the plurality of computing tasks, wherein the elections establish a consensus for the ledger arrangement
   the ledger arrangement is configured to record the execution of the plurality of computing tasks;
   the ledger arrangement is configured to record entries of the elections, the entries being representative of a state of the data processing system and/or its data
   wherein the directed acyclic graph-allocation arrangement establishes proof for a next block and the plurality of data processing nodes is configured to obtain votes for a candidate node, wherein the candidate node upon winning becomes an elected leader related to the next block,
   wherein a reward is provided to the elected leader for closing the block, the reward is calculated as a product of a total work captured between current proof and a previous proof, an incentive multiplier, a sharing fraction and a conversion rate of work into incentive token.

2. The data processing system of claim 1, wherein the plurality of data processing nodes are incentivized to execute the plurality of computing tasks by any one of: being rewarded with tokens, being enabled to participate in the consensus governing the ledger arrangement, wherein the data processing system comprises processing of tokens for defining a metadata associated with a problem instance.

3. The data processing system of claim 2, wherein the ledger arrangement switches dynamically between a public manner of operation and a private manner of operation, in response to changes in trusted status of nodes of the data communication network.

4. The data processing system of claim 1, wherein each of the plurality of data processing nodes provides a deposit to earn a right to process the plurality of computing tasks, wherein the deposit is refunded to corresponding data processing node at a time when the data processing node withdraws from the data processing system.

5. The data processing system of claim 4, wherein the deposit is a security to ensure nonfraudulent execution of the plurality of computing tasks.

6. The data processing system of claim 1, wherein a candidate node having second highest votes is operable to close the block after a predetermined time period.

7. The data processing system of claim 1, wherein a synchronization mechanism establishes a relationship between the directed acyclic graph allocation arrangement and the ledger arrangement.

8. The data processing system of claim 1, wherein each of the plurality of data processing nodes is configured to provide a smart proof by executing the plurality of computing tasks.

9. A method of using a data processing system that processes data therein, wherein the data processing system comprises a plurality of data processing nodes that are coupled together via a data communication network arrangement, an allocation arrangement for allocation of a plurality of computing tasks, a ledger arrangement, wherein the method includes:
   arranging for the allocation arrangement to be a directed acyclic graph allocation arrangement;
   using the data processing system, when in operation, to distribute the plurality of computing tasks across the plurality of data processing nodes-the directed acyclic graph allocation arrangement;
   using the directed acyclic graph allocation arrangement to track and verify the execution of the plurality of computing tasks;
   arranging for the directed acyclic graph allocation arrangement to employ a consensus voting arrangement
   arranging for the consensus voting arrangement to employ recursive recurring elections of data processing nodes to control operation of the directed acyclic graph allocation arrangement, wherein the control of the operation of the directed acyclic graph allocation arrangement is provides incentives for the plurality of data processing nodes to process the plurality of computing tasks, wherein the elections establish a consensus for the ledger arrangement;
   using the ledger arrangement to record the execution of the plurality of computing tasks;

using the ledger arrangement to record entries of the elections, the entries being representative of a state of the data processing system and/or its data wherein the directed acyclic graph allocation arrangement is operable to establish proof for a next block and the plurality of data processing nodes is configured to obtain votes for a candidate node, wherein the candidate node upon winning becomes an elected leader related to the next block, wherein the method includes providing a reward for closing the block to the elected leader, the reward is calculated as a product of a total work captured between current proof and a previous proof, an incentive multiplier, a sharing fraction and a conversion rate of work into incentive token.

10. The method of claim 9, wherein the method includes incentivizing the plurality of data processing nodes to execute the plurality of computing tasks by any one of: being rewarded with tokens, being enabled to participate in the consensus governing the ledger arrangement; wherein the method includes processing of tokens for defining a metadata associated with a problem instance.

11. The method of claim 9, wherein the method includes arrangnig arranging for the ledger arrangement to switch dynamically between a public manner of operation and a private manner of operation, in response to changes in trusted status of nodes of the data communication network.

12. The method of claim 9, wherein the each of the plurality of data processing nodes provides a deposit to earn a right to process the plurality of computing tasks, wherein the deposit is refunded to corresponding data processing node at a time when a specific data processing node withdraws from the data processing system.

13. The method of claim 12, wherein the deposit is a security to ensure non-fraudulent execution of the plurality of computing tasks.

14. The method of claim 9, wherein a synchronization mechanism establishes a relationship between the directed acyclic graph allocation arrangement and the ledger arrangement.

15. The method of claim 9, wherein the method includes closing the block by a candidate node having second highest votes after a predetermined time period.

16. The method of claim 9, wherein the method includes providing a smart proof by the plurality of data processing nodes by executing the plurality of computing tasks;

wherein the smart proof provided by each of the plurality of data processing nodes is broadcasted to the remaining plurality of data processing nodes.

\* \* \* \* \*